Patented July 22, 1924.

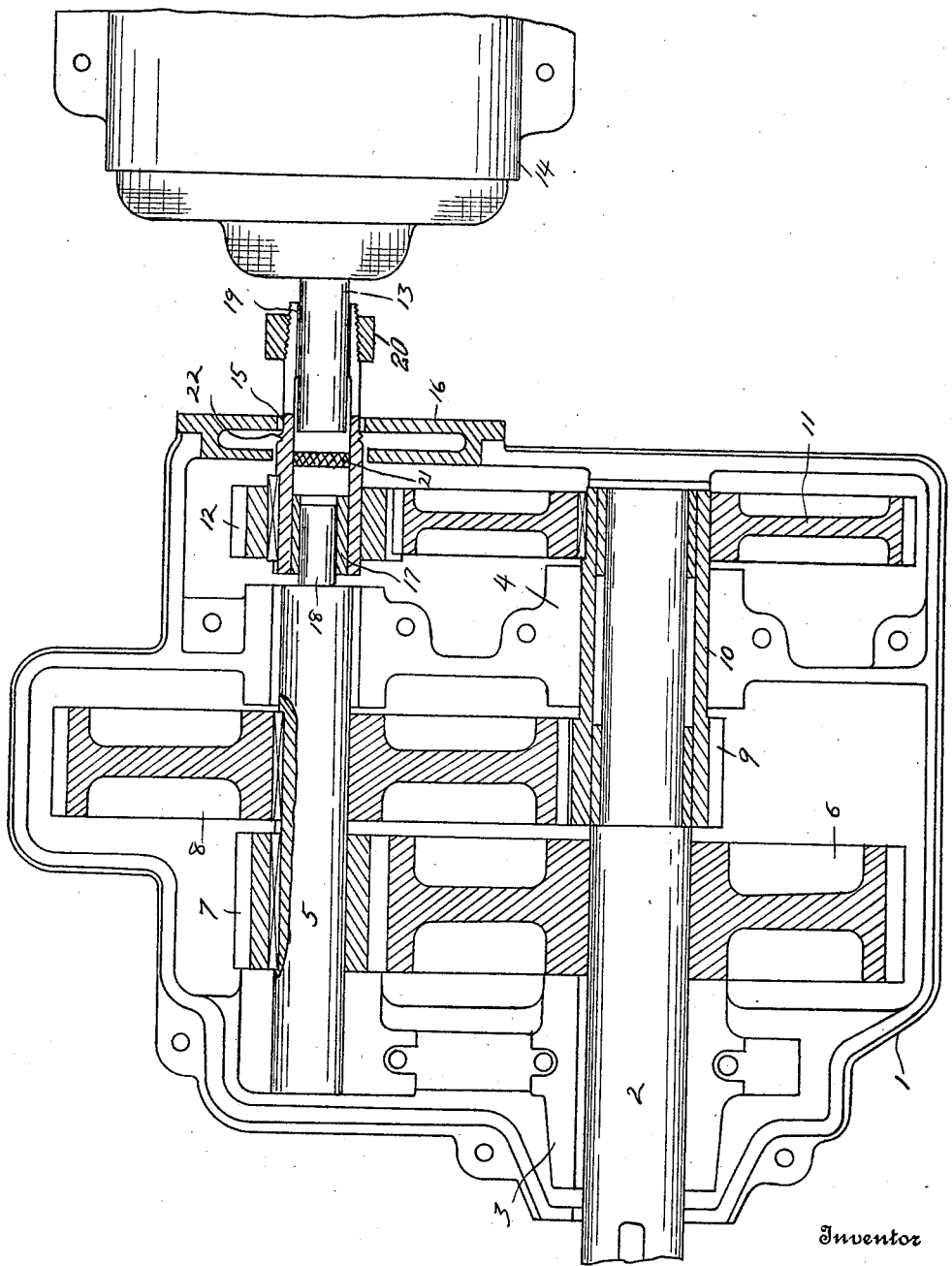

1,502,456

UNITED STATES PATENT OFFICE.

WILLIAM E. BEE, OF DETROIT, MICHIGAN, ASSIGNOR TO PALMER-BEE COMPANY, OF DETROIT, MICHIGAN, A CORPORATION OF MICHIGAN.

REDUCTION GEARING.

Application filed January 15, 1923. Serial No. 612,732.

*To all whom it may concern:*

Be it known that I, WILLIAM E. BEE, a citizen of the United States of America, residing at Detroit, in the county of Wayne and State of Michigan, have invented certain new and useful Improvements in Reduction Gearing, of which the following is a specification, reference being had therein to the accompanying drawings.

The invention relates to reduction gearing and has for one of its objects the provision of a reduction gearing to which the drive shaft of an electric motor may be quickly coupled without opening the gear casing. Other objects are the provision of a coupling which adapts itself to slight inaccuracy in alignment or endwise adjustment of the reduction gearing and electric motor; the provision of a coupling which embodies an oil slinger; and the provision of a coupling in the form of a sleeve which may be of standard diameter at its gearing end, and may be bored to suit different diameters of motor shafts.

With these and other objects in view, the invention resides in the novel features of construction and combinations and arrangements of parts as more fully hereinafter set forth.

In the drawings:

The figure is a sectional elevation of a reduction gearing embodying my invention.

1 is the lower section of the gear casing to which the upper section is removably secured. 2 is the power shaft having its axis substantially in the plane of the meeting edges of the casing sections. This power shaft is journalled in the bearing brackets 3 and 4 near opposite ends of the casing, the brackets having removable caps. 5 is a counter shaft extending parallel to the power shaft 2 and also journalled in the bearing brackets 3 and 4. The reduction gearing comprises the gear wheel 6 secured upon the power shaft 2 adjacent to the bearing bracket 3, the pinion 7 secured upon the counter shaft 5 and meshing with the gear wheel 6, the gear wheel 8 secured upon the counter shaft between the pinion 7 and the bearing bracket 4 and meshing with the pinion 9 preferably integral with the sleeve 10 and located between the gear wheel 6 and the bearing bracket 4. The sleeve 10 is rotatable about the power shaft. 11 is a gear wheel secured upon the outer end of the sleeve 10 between the bearing bracket 4 and the adjacent end wall of the casing and meshing with the pinion 12 which is driven from the drive shaft 13 of the electric motor 14 mounted at one end of the gear casing.

To quickly couple and uncouple the motor shaft without opening the gear casing, I have provided the coupling sleeve 15 upon the inner end of which is mounted the drive pinion 12. This sleeve freely extends through the double-walled closure 16 in the end of the gear casing and is journalled upon the bearing 17 in the form of a bushing at its inner end, this bearing in turn being journalled upon the reduced end 18 of the counter shaft 5 extending beyond the bearing bracket 4. The outer end of the sleeve has the series of longitudinally extending saw cuts 19 therein and has an internal diameter bored to fit over the motor shaft 13. To clamp the sleeve upon the motor shaft its outer end is externally bevelled and threaded and is engaged by the nut 20 which upon being tightened up forces the segments of the sleeve into firm engagement with the motor shaft. To prevent dust from entering the gear casing through the coupling sleeve and at the same time to prevent oil from passing out of the casing through this coupling sleeve, I have provided the closure 21 extending transversely within the coupling sleeve intermediate the motor and counter shafts.

To prevent oil from passing out of the gear casing along the outer periphery of the coupling sleeve and through the opening in the double-walled closure through which the sleeve passes, I have provided the annular V-shaped projection 22 upon the coupling sleeve and located between the two walls of the closure 16 whereby the oil as it travels outwardly along the coupling sleeve will be thrown from its annular projection into the space between the two walls of the closure after which it is drained therefrom through suitable openings placing the interior of the double-walled closure in communication with the interior of the gear casing.

The inner end of the coupling sleeve 15 is spaced from the adjacent side of the bearing bracket 4 a sufficient distance to permit of the normal endwise movement of the sleeve and its drive pinion with the drive shaft and motor armature.

From the above description it will be readily seen that I have provided a reduction gearing to which the motor shaft may be readily coupled without opening the gear casing since the coupling member extends outwardly beyond the end of the gear casing and is firmly clamped to the motor shaft at this point. It will also be seen that the alignment of the motor and gearing or the relative endwise adjustment thereof may be slightly inaccurate, but the coupling sleeve is designed to take care of this inaccuracy owing to its flexibility; and also that the coupling sleeve embodies an oil slinger which is difficult to apply separately to a motor shaft. Still another important feature is that the coupling sleeve may be of standard diameter at its inner or gearing end and may be bored to fit different diameters of motor shafts at its outer end, the flexibility of the sleeve being increased by increasing the bore adjacent to its friction jaws.

What I claim as my invention is:

1. The combination with a gear casing, of a drive shaft outside said gear casing, a coupling sleeve having an outer flexible portion surrounding and clamped at its end upon said drive shaft, a bearing within said casing for the inner end of said coupling sleeve, and gearing within said casing including a gear member secured upon the inner end of said coupling sleeve and surrounding a portion of said bearing.

2. The combination with a gear casing, of a drive shaft outside said gear casing, a coupling sleeve extending within said casing and having a longitudinally slitted outer end surrounding and clamped upon said drive shaft, a bearing within said casing for the inner end of said coupling sleeve, and gearing within said casing including a gear member secured upon said coupling sleeve and surrounding a portion of said bearing.

3. The combination with a gear casing, of a drive shaft outside said casing, a coupling sleeve having a longitudinally slitted outer portion surrounding and clamped upon said drive shaft, a nut having a wedging engagement with said coupling sleeve at its outer end, a bearing within said casing for the inner end of said coupling sleeve, and gearing within said casing including a gear member upon the inner end of said coupling sleeve and surrounding a portion of said bearing.

4. The combination with a gear casing and a shaft having a portion within said casing with an end spaced from an end wall thereof, of a drive shaft outside said casing in substantially axial alignment with said first mentioned shaft, a coupling sleeve having an outer flexible portion surrounding and clamped upon said drive shaft and an inner portion journaled upon said first mentioned shaft, and gearing between said shafts including a gear member upon said coupling sleeve and surrounding a portion of the journaled portion of said coupling sleeve.

In testimony whereof I affix my signature.

WILLIAM E. BEE.